Patented July 27, 1937

2,088,018

UNITED STATES PATENT OFFICE 2,088,018

OXYGENATED COMPOUNDS DERIVED FROM BUTYRALDEHYDE AND ITS DERIVATIVES

Jacob N. Wickert, Charleston, and Benjamin T. Freure, South Charleston, W. Va., assignors, by mesne assignments, to Union Carbide and Carbon Corporation, a corporation of New York No Drawing. Application December 20, 1934,
Serial No. 758,438

19 Claims. (Cl. 260—134)

The invention relates to the production of a new series of oxygenated aliphatic compounds, and more especially it concerns the manufacture of certain secondary aliphatic alcohols having more than 8 carbon atoms in their molecules, and certain sulfate esters thereof, as well as new intermediate ketonic products formed in the course of their production.

The saturated ketones and secondary alcohols of the present invention have wide utility as solvents; and the alcohols are also adapted for use in the production of their sulfate esters, the latter of which have been found to have valuable industrial application as detergents, and also in treating liquors employed in the textile, leather, and other industries as wetting, foaming, emulsifying and impregnating agents.

In the preferred practice of the invention, butyraldehyde,—or a derivative thereof such as ethylpropylacrolein,—formed by the condensation of two molecules of butyraldehyde followed by a dehydration of the resultant ketol; or ethylhexaldehyde,—formed by the hydrogenation of ethylpropylacrolein,—is condensed with a ketone, or a mixture thereof, such as those hereinafter mentioned. The condensation reaction may be conducted in the presence of an aqueous or alcoholic solution of caustic alkali or its equivalent, at a temperature below about 40° C., and preferably around 20°–25° C. The resultant ketol is made slightly acid to phenolphthalein by means of a dilute solution of an acid, such as sulfuric acid or other strong acid, or with a weak acid such as tartaric acid, acetic acid, etc. The acidified product is filtered free of inorganic salts, and the filtrate is fractionally distilled for the double purpose of separating from the filtrate the unreacted starting materials and water, and of dehydrating the ketol to form the corresponding unsaturated ketone. This reaction mixture is then fractionally distilled under vacuum, the fraction containing the desired unsaturated ketone being separately recovered.

The unsaturated ketone thereafter is hydrogenated, desirably in the liquid phase, under superatmospheric pressure within a pressure range of from 1 to 100 atmospheres, and preferably around 700 pounds to 1000 pounds per square inch, and at temperatures within the range of from about 20° C. to about 200° C., preferably not above from around 150° to 160° C., in the presence of an active hydrogenating catalyst such as active nickel, platinum or copper.

As the hydrogenation proceeds, the saturated ketone first is produced; and continued hydrogenation yields the corresponding secondary alcohol. The proportions of the said ketone and alcohol formed depends upon the extent of the hydrogenation. The ketones have somewhat lower boiling points than the corresponding alcohols, and may readily be separated therefrom by fractional distillation. The reaction mixture is filtered to remove the catalyst, and the filtrate is fractionally distilled under vacuum, the fractions respectively containing the ketone and the secondary alcohol being separately recovered.

For the preparation of the acid sulfate ester of the secondary alcohol thus produced, the alcohol is reacted with a sulfating agent, such as concentrated sulfuric acid or chlorsulphonic acid, under suitable conditions by any one of the several well known methods now employed for sulfating primary alcohols. According to one method the secondary alcohol is reacted with approximately an equivalent amount of equimolar proportions of 96% sulfuric acid and acetic anhydride, at low temperatures maintained preferably from about 0° C. to about 10° C. The concentration of the sulfuric acid can vary considerably; or that acid or sulfuric anhydride can be used alone; and other anhydrides of organic acids, or the acids themselves, or their chlorides, may be substituted for acetic anhydride.

The acid sulfate ester may be neutralized to produce the corresponding neutral sulfate ester by means of caustic alkali or other alkaline compound, such as ammonium hydroxide, or the organic amines such as the ethanolamines.

The following examples will serve to illustrate the invention:

Example 1

To 25 gram mols of methylethyl ketone was added enough (250 c. c.) methanolic sodium hydroxide to render it alkaline to phenolphthalein. To this mixture was added 10 gram mols of 2-ethylhexaldehyde with vigorous stirring, and the reaction mixture stirred for 20 hours while maintained at a temperature of 20°–25° C., as the specific gravity slowly attained a maximum. The product was then made slightly acid to phenolphthalein with concentrated sulfuric acid. Some sodium sulfate which separated out was filtered off; and the clear filtrate was distilled at atmospheric pressure to remove unreacted ketone and water. The stripped product was allowed to cool, and was washed with aqueous 10% sodium hydroxide solution to remove any acidic impurities. The product was then fractionally distilled under reduced pressure, and the fraction boiling between 130° and 140° C. at 20 mm. absolute pressure, and containing the unsaturated 12-carbon ketone, 6-ethyldecene-4-one-3, was separately recovered.

To this ketone was added 5% of its weight of active nickel catalyst prepared from nickel silicon, and the mixture was placed in an agitated pressure vessel and hydrogenated until the pressure in the vessel was between 600 pounds and 1000 pounds per square inch. The temperature of the vessel and contents was raised slowly from 20° C. to about 150°–160° C., the pressure being maintained at 800–900 pounds per square inch by additions of hydrogen until no further absorption of hydrogen was noted.

The cooled product was filtered to remove the catalyst, and the clear filtrate was fractionated under reduced pressure. The secondary alcohol, 6-ethyldecanol-3, was separately recovered. It boils at from 115° to 118° C. at 10 mm. of mercury absolute pressure.

The acid sulfate ester of this alcohol was prepared by slowly adding to a solution of the secondary dodecyl alcohol in ββ' dichloroethyl ether, cooled to around 15° C., a solution of chlorsulphonic acid in ββ' dichlorethyl ether containing a molecular equivalent of the acid based on the amount of alcohol used. The mixture was agitated during the addition of the acid, and an inert gas was blown through it during this time and for an additional period of 15 minutes. The reaction mixture then was neutralized with dilute aqueous caustic soda. Upon standing, the mixture separated into layers. The aqueous layer was isolated and was evaporated to dryness under a reduced pressure of from 100 mm. to 10 mm. of mercury absolute. The residue was taken up in methanol, and the resulting mixture was filtered. Subsequent evaporation of the filtrate under reduced pressure yielded a colorless wax which was completely soluble both in methanol and water, and which produced a stable foam when shaken with water.

Also suitable as starting materials in the process are those saturated and unsaturated ketones produced by the condensation of butyraldehyde or a higher aldehyde with acetone or its derivatives, such as methylethyl ketone, followed by the loss of the elements of water from the resultant ketols; and the higher molecular weight ketones produced by the partial hydrogenation of such ketones, as exemplified by butylidene acetone, methylamyl ketone, dipentenyl ketone, methylheptenone, and methylheptanone.

Example 2

2840 g. of methylamyl ketone was condensed with 865 g. of butyraldehyde by mixing the former with 100 c. c. of 10% alcoholic caustic soda, and allowing the aldehyde to drop slowly into this mixture over a period of 4 hours, while agitating and maintaining it at a temperature of about 20° C. The mixture was then made slightly acid with phosphoric acid, and distilled under reduced pressure. The fraction boiling at 112°–115° C. under 18 mm. of mercury absolute pressure, contained the unsaturated ketone, undecene-4-one-6. It was separately recovered, washed with sodium carbonate solution, and redistilled. This ketone was then hydrogenated in the liquid phase under 900–1000 pounds per square inch gauge pressure and a temperature of 60°–80° C., using an active nickel catalyst. The saturated diamyl ketone, undecanone-6, formed by the hydrogenation, is a liquid, boiling at 225° C. under atmospheric pressure, and solidifying at 14° C. It was recovered upon fractional distillation of the reaction mixture.

The secondary alcohol, diamyl carbinol, concurrently produced in the hydrogenation, was recovered as a viscous, water-white liquid boiling at 108°–109° C. at 13 mm. of mercury absolute pressure. It has a specific gravity at 20° C. of .836. It was dissolved in methanol, cooled to about −40° C. and purified by repeated crystallizations. The purified undecanol-6 has a melting point of 24.2° C., and a boiling point of 228°–229° C. under atmospheric pressure.

This undecyl alcohol was sulfated to form the acid sulfate ester, which was then converted to the neutral sodium undecyl sulfate, both steps being conducted in the manner described in Example 1. The sodium undecyl sulfate was obtained as a colorless solid of waxlike consistency having strong wetting, foaming, emulsifying and detergent properties. It is soluble in water, and in alcohols, esters, ketones and hydrocarbons, and its aqueous solutions are unaffected by acids and alkalis.

Example 3

To a mixture of 8635 g. of methylisobutyl ketone and 100 g. of potassium hydroxide dissolved in 400 g. of methanol in a closed vessel, there was slowly added 3 kg. of butyraldehyde over a period of five hours with constant agitation, while maintaining the temperature at about 20° C. for a total period of thirty hours. The resultant product was made slightly acid with sulfuric acid, and was fractionally distilled. The fraction boiling at 75° C. at 6 mm. of mercury absolute pressure contained the unsaturated 10-carbon ketone, 2-methylnonen-5-one-4.

This unsaturated ketone fraction was hydrogenated in the liquid phase, using an active nickel catalyst, being maintained under about 900 pounds per square inch gauge hydrogen pressure for six and a half hours at about 70° C., thus saturating the double bond without substantially affecting the carbonyl group, and yielding the saturated ketone, 2-methylnonanone-4, hereinafter described. This ketone was recovered by fractionation of the reaction mixture under reduced pressure.

Another quantity of the unsaturated ketone was hydrogenated under around 900 pounds per square inch hydrogen pressure for thirteen hours while gradually heating it to 150° C., thus completely hydrogenating the ketone to form the secondary decyl alcohol, 2-methylnonanol-4, which was recovered from the reaction mixture by fractional distillation under reduced pressure. (See Table I.)

This secondary decyl alcohol was reacted with chlorsulphonic acid in the manner described in Example 1, producing the corresponding acid sulfate ester which was then treated with caustic alkali to form the neutral sodium secondary decyl sulfate. The latter is a white wax, readily soluble in water and organic solvents.

Example 4

A mixture of 22 gram mols of methylamyl ketone and 11 gram mols of 2-ethylhexaldehyde was made alkaline with 150 c. c. of a 10% methanolic solution of caustic soda, and was stirred until the specific gravity at 20° C. of the reaction product reached a maximum of .864 at 20° C. The product was freed of excess alkali and any acidic impurities by washing with warm water. The washed oil layer was made just acid to phenolphthalein, and was distilled under reduced pressure. A fraction boiling in the range from 117° C. to 175° C. at 14 mm. of mercury absolute pressure was redistilled under reduced pressure, and yielded the pure unsaturated ketone, 9 ethyltridecen-7-one-6. (See Table I.)

This ketone was hydrogenated at 140°-150° C. under a pressure of about 900 pounds per square inch, using an active nickel catalyst, yielding the secondary pentadecyl alcohol, 9-ethyltridecanol-6, boiling at 143°-144° C. at 7 mm. of mercury absolute pressure. The latter may be sulfated in the manner described hereinafter in Example 5.

The same secondary alcohol and the corresponding saturated ketone may be produced by reacting in similar manner ethylhexaldehyde and butylidene acetone, though in somewhat lower yields based on the aldehyde charged.

Example 5

Thus, 1880 g. of butylidene acetone and 1025 g. of 2-ethylhexaldehyde were reacted in the presence of 100 c. c. of 10% methanolic caustic soda at a temperature of about 20°-25° C. for about twenty hours. The reaction product was then neutralized with carbon dioxide and filtered. A few crystals of iodine (less than .1% of the weight of the liquid) were added to the clear filtrate, and the mixture was distilled under reduced pressure. The fraction boiling at from 75° C. at 25 mm. of mercury to 175° C. at 10 mm. of mercury absolute pressure was freed of acidic impurities, and was redistilled to give the doubly unsaturated 15-carbon ketone, 9 ethyltridecadiene-4, 7-one-6, boiling at 158°-160° C. at 13 mm. absolute pressure. This was hydrogenated in the manner described in Example 4, yielding the secondary pentadecyl alcohol, 9-ethyltridecanol-6.

Upon sulfation of this secondary pentadecyl alcohol with chlorsulphonic acid, in the manner described in Example 1, the acid sulfate ester of this alcohol was formed which, upon neutralization with caustic soda, yielded the corresponding sodium secondary pentadecyl sulfate, a colorless wax having distinct detergent properties, and readily soluble in water and in organic solvents such as methanol, benzol, diethyl ether, and ethyl acetate.

Example 6

17 kg. of dipropyl ketone was agitated with 9 kg. of 2-ethylhexaldehyde in the presence of 8.5 kg. of a 10% methanolic solution of potassium hydroxide, at 25°-30° C. for sixty-seven hours. The condensed product was slightly acidified and distilled under reduced pressure. After removal of unreacted starting materials, a fraction was obtained boiling between 102° C. and 130° C at 6 mm. of mercury absolute pressure, containing the unsaturated 15-carbon ketone, 5,7 diethylundecen-5-one-4. It was washed free of acidic impurities with aqueous sodium carbonate, and was then converted to the secondary alcohol, 5,7 diethylundecanol-4, by hydrogenation under a pressure of around 900 pounds per square inch and at temperatures up to around 150° C., in the presence of an active nickel catalyst. The hydrogenated product was filtered, and the filtrate was fractionally distilled under reduced pressure. The secondary pentadecyl alcohol boiling between 133°-134° C. at 10 mm. of mercury absolute pressure was separately recovered.

This alcohol was sulfated with a solution of chlorsulphonic acid in $\beta\beta'$ dichlorethyl ether in the manner described in Example 1, yielding a sulfate ester which, upon neutralization with caustic soda, produced sodium pentadecyl sulfate in the form of a stable white wax of good detergent properties soluble in water and in organic solvents similarly to the secondary pentadecyl sulfate of Example 4.

Example 7

1975 g. of methylheptenone, prepared by condensing butyraldehyde with methylethyl ketone and removing the elements of water from the resultant ketol, was reacted at 20° C. for six hours with 900 g. 2-ethylhexaldehyde, in the presence of 150 c. c. of 10% methanolic caustic soda. The mixture was then neutralized with phosphoric acid, and the resultant ketol was dehydrated by heating the mixture to boiling in the presence of a catalytic proportion of iodine. The mixture was distilled, and the doubly-unsaturated 16-carbon ketone, 9 ethyl-5-methyltridecadien-4,7-one-6, was recovered, upon redistillation of the fraction distilling between 135° and 175° C. at 16 mm. of mercury absolute pressure, as a liquid boiling at 148°-153° C. at 8 mm. of mercury absolute pressure, and at 290° C. at atmospheric pressure.

Upon hydrogenation of this unsaturated ketone in the manner described in Example 1, the secondary hexadecyl alcohol, 9 ethyl-5-methyltridecanol-6, was formed, boiling at 287°-288° C at atmospheric pressure, and at 155°-157° C. at 10 mm. of mercury absolute pressure. This alcohol was recovered in the manner set out in Example 1.

The alcohol, dissolved in $\beta\beta'$ dichlorethyl ether, was then sulfated in the manner described in Example 1, using a solution of chlorsulphonic acid in $\beta\beta'$ dichlorethyl ether, and the resultant acid sulfate ester was neutralized with caustic alkali to produce neutral sodium hexadecyl sulfate, a white waxy solid having valuable detergent and textile wetting properties, and which was soluble in water and in the ordinary organic solvents.

Example 8

6 kg. of 3-methylheptanone-2, prepared by condensing butyraldehyde with methylethyl ketone, dehydrating the ketol formed, and hydrogenating the resultant methylheptenone, was mixed with 3 kg. 2-ethylhexaldehyde and enough methanolic caustic soda to maintain the mixture alkaline to phenolphthalein, and was reacted at about 20° C. for sixteen hours. The crude reaction product was washed with water, then slightly acidified with sulfuric acid, and was distilled. The fraction boiling at between 80° C. and 160° C. at 17 mm. of mercury absolute pressure was refractionated under reduced pressure, and yielded the unsaturated 16-carbon ketone, 9 ethyl-5-methyltridecen-7-one-6, boiling at 148°-150° C. at 11 mm. of mercury absolute pressure. Upon slow hydrogenation thereof under pressures around 700-800 pounds per square inch and temperatures around 50°-80° C., the corresponding saturated ketone, 9-ethyl-5-methyltridecanone-6, was formed, boiling at 143°-144° C. at 9 mm. of mercury absolute pressure, and at 284°-285° C. at atmospheric pressure. Upon further hydrogenation at temperatures around 140°-150° C. the secondary alcohol, 9 ethyl-5-methyltridecanol-6, described in Example 7, was produced.

In Table I are set out some of the physical properties of certain of the ketones and secondary alcohols of the present invention; and Table II lists certain identifying properties of the sodium secondary alkyl sulfates.

TABLE I
Physical properties of condensation products

| No. | Reaction products | Carbon atoms in molecule | Boiling range 760 mm. | Boiling range Vacuum °C. @ mm. Hg. | Specific gravity at 20° C. | Refractive index at 20° C. |
|---|---|---|---|---|---|---|
| 1 | 2-methylnonene-5-one-4 | 10 | 205 | 75/6 | 0.851 | |
| 2 | 2-methylnonanone-4 | 10 | 194 | 76/9 | 0.819 | |
| 3 | 2-methylnonanol-4 | 10 | 205 | 92-3/13 | 0.821 | 1.4307 |
| 4 | undecen-4-one-6 | 11 | 224-5 | 112-3/18 | 0.853 | 1.4518 |
| 5 | undecanone-6 | 11 | 225 | M. P. 14° | 0.826 | |
| 6 | undecanol-6 | 11 | 228-9 | M. P. 24.2 | 0.821 (at 30° C). | 1.4352 (at 25° C). |
| 7 | 6-ethyldecene-4-one-3 | 12 | 235 | 130-40/20 | 0.882 | |
| 8 | 6-ethyldecanol-3 | 12 | 225 | 115-8/10 | 0.848 | |
| 9 | 9-ethyltridecadiene-4, 7-one-6 | 15 | 222 | 158-60/13 | 0.884 | |
| 10 | 9-ethyltridecene-7-one-6 | 15 | 255 | 150-5/14 | 0.852 | |
| 11 | 5, 7-diethylundecen-5-one-4 | 15 | 240 | 118-20/6 | 0.854 | |
| 12 | 9-ethyltridecanol-6 | 15 | 276-7 | 143-4/7 | 0.8497 | 1.4489 |
| 13 | 5, 7-diethylundecanol-4 | 15 | 264-5 | 133-4/10 | 0.838 | |
| 14 | 9-ethyl-5-methyltridecadiene-4, 7-one-6 | 16 | 290 | 148-53/8 | 0.892 | |
| 15 | 9-ethyl-5-methyltridecene-7-one-6 | 16 | 285 | 148-50/11 | 0.849 | 1.455 |
| 16 | 9-ethyl-5-methyltridecanone-6 | 16 | 284-5 | 143-4/9 | 0.839 | 1.4420 |
| 17 | 9-ethyl-5-methyltridecanol-6 | 16 | 287-8 | 155-7/10 | 0.839 | 1.4492 |

TABLE II
Properties of sodium secondary alkyl sulfates

| Substance | 0.25% Aqueous solution Drop No. at 30° C. | 0.25% Aqueous solution Interfacial tension, dynes per sq. cm., at 26° C. |
|---|---|---|
| Sodium octyl sulfate | 30 | 37.8 |
| Sodium decyl sulfate | 31 | 30.5 |
| Sodium undecyl sulfate | 40 | 25.6 |
| Sodium dodecyl sulfate | 45 | 21.8 |
| Sodium pentadecyl sulfate (Example 5) | 90 | 11.0 |
| Sodium pentadecyl sulfate (Example 4) | 167 | 8.2 |
| Sodium hexadecyl sulfate (Example 8) | 228 | 3.5 |
| Distilled water | 22 | 44.2 |

The method of relative drop numbers evaluates the wetting and emulsifying power of these alkyl sulfates. The method consists in slowly dropping a fixed volume of a .25% aqueous solution of the said sulfate from a ground tip into a body of kerosene, at 30° C. The tip is calibrated by counting the number of drops of pure water formed under like conditions, and the greater number of drops of the solution under examination measures the relative interfacial tension or emulsifying power of the substance being tested. When this measurement is made carefully from a tip of known diameter, the interfacial tension can be calculated in dynes, as described by Harkins and Brown, J. A. C. S., 41, 499 (1919); and by E. B. Millard, Ind. Eng. Chem. 15, 810 (1923).

The physical properties of the secondary alcohols produced in accordance with the invention appear to vary both with their molecular weight and molecular structure. Moreover, the sulfate esters prepared from secondary alcohols having the same number of carbon atoms in the molecule but having different molecular structures differ in their properties, as is indicated in Table II, above. For example, whereas a .25% aqueous solution of the sodium pentadecyl sulfate produced in Example 5 has a drop number at 30° C. of 90, the sodium pentadecyl sulfate formed in Example 4 has a drop number at 30° C. of 167.

While ethylhexaldehyde is the 8-carbon aldehyde employed in certain of the foregoing examples, the same products can be produced by substituting for it in the process, its precursor, ethylpropylacrolein, although the yields in such case will be somewhat lower.

It is possible to substitute for the selected ketone-starting materials, a mixture of reactants capable of producing these ketones under the conditions existing during the condensation. Thus, mixtures of methylethyl ketone and butyraldehyde may be substituted for the methylheptenone of Example 7.

The neutral sulfate esters of these secondary branched-chain alcohols are waxy solids, soluble in water, the lower alcohols up to and including butanol, benzene, hexane, ethyl ether, isopropyl ether, and in acetone and other ketones, their aqueous solutions are strongly detergent and are highly resistant to decomposition by dilute acids and alkalies.

Ethanol or other inert volatile diluent for the ketone and aldehyde reactants can be substituted for the methanol in the condensation reaction. The use of such diluent is desirable but not essential.

The invention is susceptible of modification within the scope of the appended claims.

We claim:

1. In the process of making an oxygenated organic compound having at least 10 carbon atoms in the molecule, the steps which comprise condensing butyraldehyde and a ketone having at least 6 carbon atoms in its molecular structure, in the presence of an alkali, removing the elements of water from the ketol thus produced, thereby forming an unsaturated ketone, and hydrogenating the latter under superatmospheric pressure at temperatures up to about 200° C. in the presence of a hydrogenating catalyst.

2. In the process of making an oxygenated organic compound having at least 10 carbon atoms in the molecule, the step which comprises condensing butyraldehyde with an unsymmetrical methyl ketone having at least 6 carbon atoms in its molecular structure, removing the elements of water from the ketol thus produced, thereby forming an unsaturated ketone, and hydrogenating the latter under superatmospheric pressure at temperatures up to around 150° C. in the presence of a hydrogenating catalyst.

3. In the process of making an oxygenated compound, the steps which comprise condensing ethylhexaldehyde with a ketone, in the presence of an alkali, removing the elements of water from the ketol thus produced, thereby forming an unsaturated ketone, and hydrogenating the latter under superatmospheric pressure at temperatures up to around 200° C. in the presence of a hydrogenating catalyst.

4. A chemical compound identical with that resulting from the hydrogenation of the unsaturated ketone formed upon removal of the elements of water from the condensation product of ethylhexaldehyde with methylheptanone, the same being a hexadecyl saturated kentone boiling at 284°–285° C. under atmospheric pressure, and at 143°–144° C. under 9 mm. of mercury absolute pressure, and apparently having the structure corresponding to 9-ethyl-5-methyltridecanone-6.

5. A chemical compound identical with that resulting from the hydrogenation of the unsaturated ketone formed upon removal of elements of water from the condensation product of ethylhexaldehyde and methylheptanone, the same being a secondary branched-chain aliphatic hexadecyl alcohol boiling at 287°–288° C. under atmospheric pressure and at 155°–157° C. under 10 mm. of mercury absolute pressure, and apparently having the structure corresponding to 9-ethyl-5-methyltridecanol-6.

6. As a new chemical compound, a saturated branched-chain aliphatic oxygenated compound, the same being a high-boiling organic solvent having the structure corresponding to the formula $$C_4H_9CH(C_2H_5)CH_2XYRR'$$

wherein X is a member of the group consisting of $CH_2$ and $CH(C_2H_5)$ groups, Y is a member of the group consisting of a carbonyl group and a secondary alcohol group, R is a member of the group consisting of $CH_2$ and $CH(CH_3)$, and R' is a member of the group consisting of a methyl, ethyl, and butyl group.

7. As a new chemical compound, a saturated branched-chain aliphatic ketone, the same being a high-boiling liquid having the structure corresponding to the formula $$C_4H_9CH(C_2H_5)CH_2XCORR'$$

wherein X is a member of the group consisting of $CH_2$ and $CH(C_2H_5)$, R is a member of the group consisting of $CH_2$ and $CH(CH_3)$, and R' is a member of the group consisting of a methyl, ethyl, and butyl group.

8. As a new chemical compound, a saturated branched-chain secondary alcohol, the same being a viscous high-boiling organic solvent having the structure corresponding to the formula $$C_4H_9-CH(C_2H_5)-CH_2-X-CHOH-R-R'$$

wherein X is a member of the group consisting of $CH_2$ and $CH(C_2H_5)$, R is a member of the group consisting of $CH_2$ and $CH(CH_3)$, and R' is a member of the group consisting of a methyl, ethyl, and butyl group.

9. In the process of making an oxygenated organic compound having at least 10 carbon atoms in the molecule, the steps which comprise condensing a ketone having at least 6 carbon atoms in its molecule with a compound selected from the group consisting of butyraldehyde, ethylhexaldehyde, and ethylpropylacrolein, in the presence of an alkali, removing the elements of water from the ketol thus produced, thereby forming an unsaturated ketone, and hydrogenating the latter under superatmospheric pressure at temperatures up to about 200° C., in the presence of a hydrogenating catalyst.

10. The process of making a saturated branched-chain oxygenated organic compound having at least 10 carbon atoms in the molecule, which comprises condensing an aliphatic aldehyde selected from the group consisting of butyraldehyde, ethylhexaldehyde, and ethylpropylacrolein, with a ketone having in its molecule (m–n) carbon atoms, wherein m represents at least 10, and n represents the number of carbon atoms in a molecule of the said selected aldehyde, in the presence of an alkali, removing the elements of water from the ketol thus produced, thereby forming an unsaturated ketone, and hydrogenating the latter under superatmospheric pressure at an elevated temperature not substantially above 200° C., in the presence of a hydrogenating catalyst.

11. The process of making a saturated branched-chain oxygenated aliphatic compound having 10 carbon atoms in the molecule, which comprises condensing butyraldehyde and methylisobutyl ketone in the presence of an alkali, removing the elements of water from the ketol thus produced, and hydrogenating the resultant unsaturated ketone under superatmospheric pressure at an elevated temperature, and separately recovering the resultant 10-carbon branched-chain oxygenated compound thus produced.

12. The process of making a saturated branched-chain aliphatic decyl ketone, which comprises condensing butyraldehyde and methylisobutyl ketone in the presence of an alkali, removing the elements of water from the ketol thus produced, hydrogenating the resultant unsaturated ketone under superatmospheric pressure under conditions adapted to remove the unsaturation of the ketone, and recovering separately from the resultant mixture the saturated decyl ketone thus produced.

13. The process of making a saturated branched-chain secondary decyl alcohol, which comprises condensing butyraldehyde and methylisobutyl ketone in the presence of an alkali, removing the elements of water from the ketol thus produced, thereby forming an unsaturated ketone, hydrogenating the latter under superatmospheric pressure at an elevated temperature, and separately recovering from the resultant reaction mixture the said secondary decyl alcohol thus produced.

14. The process of making a saturated branched-chain oxygenated aliphatic compound having 11 carbon atoms in the molecule, which comprises condensing butyraldehyde and methylamyl ketone in the presence of an alkali, removing the elements of water from the ketol thus produced, hydrogenating the resultant unsaturated ketone under superatmospheric pressure at an elevated temperature, and separately recovering the resultant 11-carbon branched-chain oxygenated compound thus produced.

15. The process of making a saturated branched-chain undecyl ketone, which comprises condensing butyraldehyde and methylamyl ketone in the presence of an alkali, removing the elements of water from the ketol thus produced, hydrogenating the resultant unsaturated ketone under superatmospheric pressure, under conditions adapted to remove the unsaturation of the ketone, and separately recovering from the resultant mixture the saturated undecyl ketone thus produced.

16. The process of making a saturated branched-chain secondary undecyl alcohol, which comprises condensing butyraldehyde and methylamyl ketone in the presence of an alkali, removing the elements of water from the ketol thus produced, thereby forming an unsaturated ketone, hydrogenating the latter under superatmospheric pressure at an elevated temperature, and separately recovering from the resultant reaction mixture the said branched-chain secondary undecyl alcohol thus produced.

17. The process of making a saturated branched-chain hexadecyl oxygenated compound, which comprises condensing ethylhexaldehyde and an 8 carbon aliphatic ketone in the presence of an alkali, removing the elements of water from the ketol thus produced, hydrogenating the resultant unsaturated ketone under superatmospheric pressure at an elevated temperature, and separately recovering the resultant branched-chain hexadecyl oxygenated compound thus produced.

18. The process of making a saturated branched-chain hexadecyl ketone, which comprises condensing ethylhexaldehyde and an 8 carbon aliphatic ketone in the presence of an alkali, removing the elements of water from the ketol thus produced, hydrogenating the resultant unsaturated ketone under superatmospheric pressure, under conditions adapted to remove the unsaturation of the ketone, and recovering separately from the resultant mixture the saturated hexadecyl ketone thus produced.

19. The process of making a saturated branched-chain secondary hexadecyl alcohol, which comprises condensing ethylhexaldehyde and an 8 carbon aliphatic ketone in the presence of an alkali, removing the elements of water from the ketol thus produced, thereby forming an unsaturated ketone, hydrogenating the latter under superatmospheric pressure at an elevated temperature, and separately recovering from the resultant reaction mixture the said saturated secondary hexadecyl alcohol thus produced.

JACOB N. WICKERT.
BENJAMIN T. FREURE.